Patented Jan. 19, 1937

2,068,297

UNITED STATES PATENT OFFICE

2,068,297

OESTRUS-PROMOTING SUBSTANCE FROM THE ANTERIOR LOBES OF THE HYPOPHYSIS AND PROCESS OF PREPARING IT

Carl Ludwig Lautenschläger, Frankfort-on-the-Main, Otto Schaumann, Wiesbaden, and Willy Ludwig, Frankfort-on-the-Main, Germany, assignors to Winthrop Chemical Company, Inc., New York, N. Y., a corporation of New York No Drawing. Original application May 7, 1928, Serial No. 275,958. Divided and this application December 8, 1931, Serial No. 579,818. In Germany May 23, 1927

3 Claims. (Cl. 167—74)

Our present invention relates to an oestrus-promoting substance from the anterior lobes of the hypophysis and to a process of preparing it.

In our co-pending application Serial No. 275,958 a process is described for obtaining oestrus-retarding extracts from the fresh anterior lobes of the hypophysis by extracting the anterior lobes with an organic solvent liquid at ordinary temperatures and capable of dissolving lipoids.

We have furthermore found that by subjecting the fresh anterior lobes of the hypophysis freed in the aforesaid manner from the oestrus-retarding substances to a treatment with water, physiologically active substances can be obtained which provoke in non-pubescent mice a full oestrus and promote the development of the follicles.

The aqueous solutions thus obtained are separated from the solid matter and may be purified from ballast substances, e. g. by extracting with organic solvents insoluble in water, as for instance with ether.

Thus it is possible to separate from the anterior lobes of the hypophysis the substances promoting the oestrus in a state free from substances retarding or suppressing it; the oestrus-promoting and oestrus-retarding substances, when simultaneously present, obviously have an antagonistic effect upon each other. This result is all the more surprising as the problem of the action of the extracts from the anterior lobes of the hypophysis has in literature been the object of various investigations. The reason why the separate isolation of the substances in question could hitherto not be carried out lies probably in the fact that, hitherto, there were only used for the purpose in question aqueous extracts or such extracts as were obtained by treating the fresh anterior lobes of the hypophysis with alcohol which had been much diluted with water (see Evans, Berichte der ges. Physiologie, 1926, volume 35, page 305).

The following example illustrates our invention:

75 grams of finely ground fresh anterior lobes of the hypophysis of cattle are extracted four times cold, each time with 75 cc. of acetone. The resultant solutions are separated. The residue which is not soluble in acetone is extracted with water in which the concentration of the hydrogen ions may vary within wide limits (say between pH=2.5 and pH=9, and the solution is then freed from inactive ballast substances by any of the usual methods, e. g. by extracting the solution with ether. The aqueous extract thus produced shows the aforesaid oestrus-promoting action.

When carrying out the process with any suitable organic water-soluble solvent the same working method may be followed as that indicated above where acetone is used.

When using an organic solvent which is not miscible with water, such as ether or ligroin, the anterior lobes of the hypophysis may be treated simultaneously with the organic solvent and water whereby two different extract solutions are obtained, the aqueous of which contains the oestrus-promoting substance.

As far as the process relates to the treatment of the anterior lobes of the hypophysis with water, we understand thereby not only a treatment with chemically pure water, but also a treatment with solutions commonly used in the art for producing aqueous extracts such as physiological salt solution or Ringer's solution; the concentration of the hydrogen ions in the solution may be varied within wide limits.

This application is a division of our co-pending application Serial No. 275,958, filed May 7, 1928.

We claim:

1. In the process of preparing an oestrus-promoting substance from the anterior lobes of the hypophysis, the steps which comprise treating first the fresh anterior lobes of the hypophysis with an organic solvent liquid at ordinary temperatures and capable of dissolving lipoids, then separating the glands from the resultant solution and finally extracting said glands with water.

2. In the process of preparing an oestrus-promoting substance from the anterior lobes of the hypophysis, the steps which comprise treating first the fresh anterior lobes of the hypophysis with acetone, then separating the glands from the resultant solution and finally extracting said glands with water.

3. An oestrus-promoting substance obtained by treating fresh anterior lobes of the hypophysis with an organic solvent which is liquid at ordinary temperatures and capable of dissolving lipoids, separating the glands from the resultant solution and extracting said glands with water.

CARL LUDWIG LAUTENSCHLÄGER.
OTTO SCHAUMANN.
WILLY LUDWIG.